United States Patent [19]

Naka et al.

[11] Patent Number: 4,989,030
[45] Date of Patent: Jan. 29, 1991

[54] PROGRAM SHUTTER DRIVE SYSTEM

[75] Inventors: Yoji Naka; Yutaka Yoshida, both of Tokyo, Japan

[73] Assignee: Fuji Photo Film Co., Ltd., Japan

[21] Appl. No.: 330,198

[22] Filed: Mar. 29, 1989

[30] Foreign Application Priority Data

Apr. 1, 1988 [JP] Japan .................................. 63-80334

[51] Int. Cl.$^5$ .............................................. G03B 7/08
[52] U.S. Cl. .................................. 354/435; 354/271.1
[58] Field of Search ................................ 354/435–439, 354/234.1, 271.1

[56] References Cited

U.S. PATENT DOCUMENTS

| 4,354,748 | 10/1982 | Grimes et al. | 354/437 |
| 4,572,645 | 2/1986 | Yoshida et al. | 354/435 |
| 4,664,494 | 5/1987 | Hughes et al. | 354/234.1 |
| 4,839,680 | 6/1989 | Amada et al. | 354/234.1 |

Primary Examiner—Russell E. Adams
Assistant Examiner—David M. Gray
Attorney, Agent, or Firm—Pasquale A. Razzano

[57] ABSTRACT

A program shutter drive system has an ultrasonic motor for controlling an opening size of a shutter according to a programmed schedule of operation according to a brightness of a subject to be photographed. The ultrasonic motor drives the shutter to open and close according to a proper exposure determined for a subject based on a brightness of the subject by an exposure determining device. A control signal generator provides a position indicating signal and a speed indicating signal which are determined to perform a programmed schedule of operation of the shutter according to the proper exposure output. A detector is provided to output an actual position signal representing an actual opening of the shutter and an actual speed signal representing an actual speed at which the shutter opens to the actual opening size. The position and speed indicating signals are compared with the actual position and speed signals, respectively, so as to control rotation of the ultrasonic motor.

6 Claims, 9 Drawing Sheets

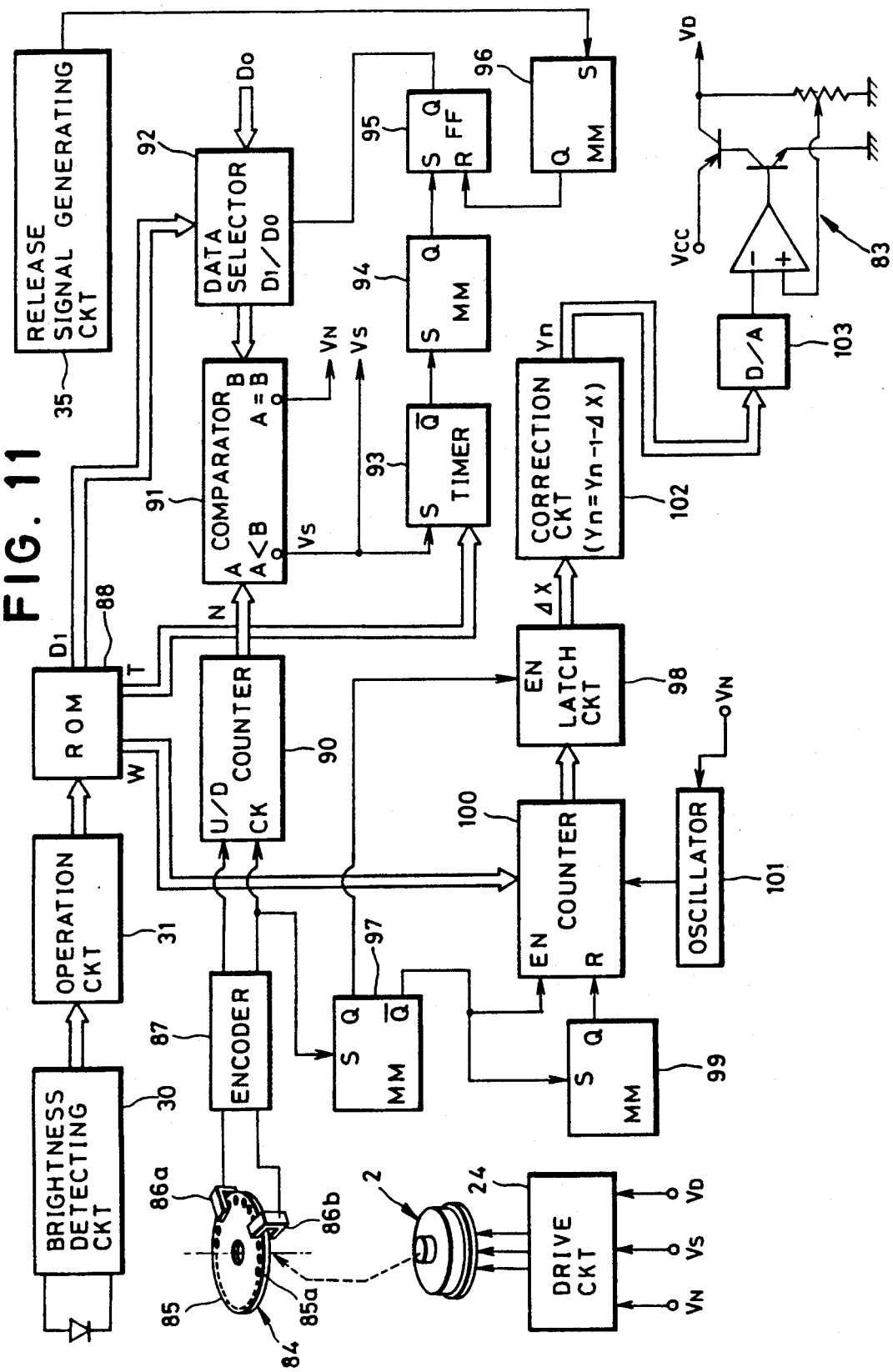

D₁,T,W

ENCODER (87) OUTPUT

COUNT VALUE N

OUTPUT SIGNAL Vs

OUTPUT SIGNAL Vn

DATA SELECTOR (92) OUTPUT

TIMER (93) OUTPUT

MM (97) Q OUTPUT

MM (99) Q OUTPUT

COUNTER (100) OUTPUT

LATCH CKT ΔX OUTPUT

CORRECTION CKT (102) OUTPUT Yn

PROGRAM SHUTTER DRIVE SYSTEM

BACKGROUND OF THE INVENTION

The present invention relates to a drive system for a program shutter of a camera which utilizes a ultrasonic motor.

Many automatic exposure (AE) compact cameras incorporated with program shutters are widely spreaded. Such a program shutter controls shutter speed and aperture according to an exposure value so as to make a programmed exposure.

In recent years, the program shutter, which consists of a plurality of shutter blades, has been developed with accurate exposure control obtained by a stepping motor. Using the stepping motor contributes to simplifying the structure of program shutter and its associated elements.

Stepping motors should have a driving torque sufficient for a steady action of shutter blades. The conventional stepping motors, however, cause unsteady shutter blades action. The stepping motor rotates stepwise through a fixed angle, so that the speed of program shutter is restricted depending upon the stepwise rotatable angle of the stepping motor. This leads to limitations of designing the program shutter.

Furthermore, the stepwise rotation of the stepping motor is controlled independently from the actual actions of the shutter blades or the actual rotation of the stepping motor, so as to decrease the accuracy of programmed exposure control.

OBJECT OF THE INVENTION

It is, therefore, a primary object of the present invention to provide a program shutter drive system in which a shutter is driven by an ultrasonic motor so as to be accurately controlled to open and close, whereby performing an exposure with a high accuracy.

SUMMARY OF THE INVENTION

The above object of the present invention can be achieved by providing a program shutter drive system which controls an opening size of a shutter according to a programmed schedule of shutter operation according to a brightness of a subject to be photographed. The program shutter drive system includes an ultrasonic motor used to drive the shutter to open and close according to a programmed schedule of operation of the shutter determined according to an exposure determined based on subject brightness.

In accordance with a preferred embodiment of the present invention, an exposure determining means determines an exposure proper for the subject based on the subject brightness and provides an exposure control output or control signal corresponding to the determined exposure. A control signal generating means provides a position indicating signal representing an opening size of the shutter to which the shutter should open which is determined to perform a programmed schedule of operation of the shutter corresponding to the proper exposure output. A position detecting means provides an actual position signal representing an actual opening size of the shutter. The position indicating signal is compared with the actual position signal and, according to the result of the comparison, rotation of the ultrasonic motor is controlled.

In accordance with another preferred embodiment of the present invention, the control signal generating means further provides an opening size indicating signal representing an opening size of the shutter to which the shutter opens and a speed indicating signal representing a speed at which the shutter should open to the opening size. Correspondingly, a speed detecting means provides an actual speed signal representing an actual speed at which the shutter opens to the actual opening size. The position and speed indicating signals are compared with the actual position and speed signals so as to control rotation of the ultrasonic motor according to the result of the comparison.

In the program shutter drive system of this invention, an actual angular position or rotated position of the ultrasonic motor is continuously monitored so as to operate or drive the shutter following a programmed schedule of operation with a high accuracy. This results in an accurate exposure control. Furthermore, the ultrasonic motor can be changed in speed without lowering output power, so as to allow the shutter to operate in differently programmed schedules of operations.

BRIEF DESCRIPTION OF THE DRAWINGS

Other objects and features of the present invention will be apparent to those skilled in the art when the following detailed description of preferred embodiments and modifications thereof is read in conjunction with the accompanying drawings in which like parts or elements are denoted same reference characters throughout the drawings and wherein:

FIG. 11 is a block diagram, similar to FIG. 3, illustrating a position signal generating circuit in accordance with still another preferred embodiment of the present invention.

DETAILED DESCRIPTION OF THE INVENTION

Figure 1:
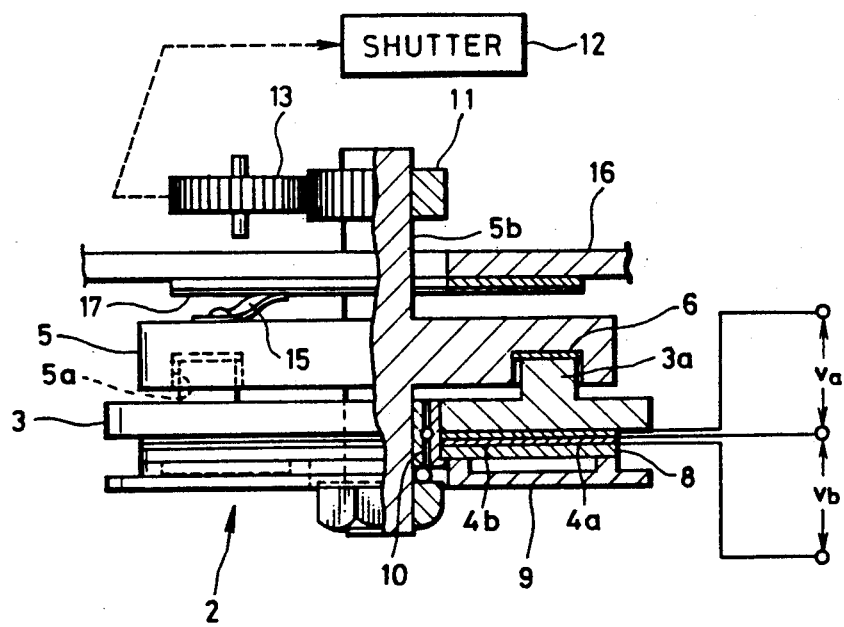
FIG. 1 is a cross-sectional view partly illustrating an ultrasonic motor used in a program shutter drive system in accordance with the present invention.

Referring now to the drawings, particularly to FIG. 1, an ultrasonic motor (USM) 2 utilized in a program shutter drive mechanism according to a preferred embodiment of the present invention is shown, having a thin or flat elastic disk body 3 that produces elastic vibrations caused with electrostrictive effects, and thin, plate like piezoelectric elements 4a and 4b made of ceramic materials which causes mechanical vibrations in the elastic body 3. The elastic stator body 3 and the piezoelectric elements 4a and 4b constitute a stator of the ultrasonic motor (UCM) 2. The elastic stator body 3 is integrally formed with a plurality of comb-teeth like projections 3a arranged at regular angular spacings in a circular arcuate form on the upper surface thereof. The piezoelectric plates are cemented to each other and the upper piezoelectric plate 4a is cemented to the under surface of the elastic stator body 3, and the other piezoelectric plate 4b is held by a holding member 9 through, for example, a felt sheet.

The ultrasonic motor (USM) 2 further has a rotatable disk body 5 constituting a rotor thereof. The rotatable disk body 5 is formed with an arcuate groove 5a which receives the projections 3a of the elastic stator body 3. A felt liner member 6 is attached to the bottom surface of the groove 5a. A shaft 5b, which is formed integrally with the rotatable disk body 5, is supported for rotation by a journal bearing 10 mounted on the elastic stator body 3.

When the piezoelectric plates 4a and 4b are applied with voltages $v_a$ and $v_b$ where the phase is delayed by 90 degrees, respectively, they produce vibrations with the electrostrictive effect, whereby the elastic stator body 3 is mechanically vibrated. The mechanical vibrations are propagated to the rotatable disk body 5 through the projections 3a and the felt liner 6, whereby the rotatable disk body 5 turns or rotates. Rotation of the rotatable disk body 5 can be changed in direction by controlling the delayed phase between the voltages $v_a$ and $v_b$, or in speed by controlling the frequency or the amplitude of voltage oscillation.

A drive gear 11 is fixedly mounted on one end of the shaft 5b opposite to the bearing 10 with respect to the rotatable disk body 5. The gear 11 is in mesh with an idler gear 13 which acts as a driver for opening and closing program shutter 12. When the rotatable disk body 5 rotates, the program shutter 12 is caused to open or close through the drive and idler gears 11 and 13. An electric conductive brush 15, which is in the form of a leaf spring, is secured to the upper surface of the rotatable disk body 5. The electric conductive brush 15 is kept in slidable contact with a resistance plate 17 secured to the lower surface of a supporting member 16 mounted on a structure of a camera. The electric conductive brush 1 5 and the resistance 17, which constitutes a position sensor 20, provides an appropriate output in the form of a voltage representing the rotated angle or rotated angular position of the rotatable disk body 5.

Figure 2:
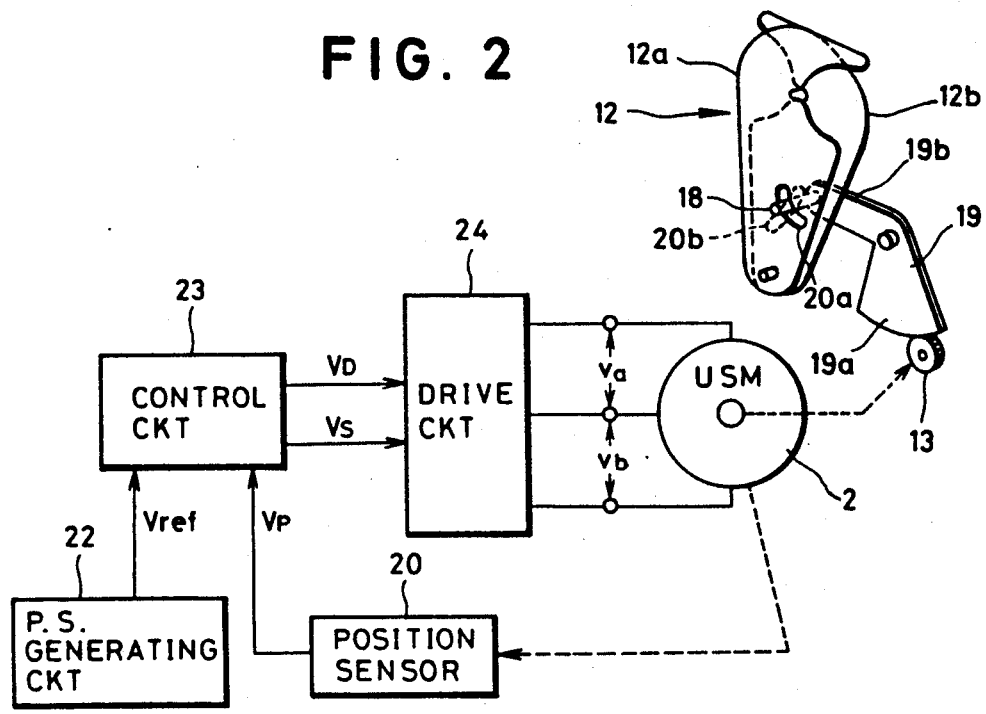
FIG. 2 is a block diagram explaining a system control circuit of a program shutter driving system of the present invention.

The ultrasonic motor (USM) 2 is controllably driven by means of a control circuit shown in FIG. 2. The position sensor 20 outputs a position signaling voltage $V_p$ according to the rotated angular position of the rotatable disk body 5. A position control signal generator circuit 22, which will be described in detail later, generates a position control or position reference voltage $V_{ref}$ to be utilized to effectively control the speed of rotation of the ultrasonic motor (USM) 2 so as to open and close the program shutter 12 according to the programmed operation of exposure. A drive control circuit 23 connected to both of the position sensor 20 and the position control signal generator circuit 22 and receives the signals $V_p$ and $V_{ref}$ therefrom, respectively. The drive control circuit 23 outputs a signal $V_D$ for controlling the rotation of the ultrasonic motor (USM) 2 and a signal $V_s$ representing a direction of rotation in which the ultrasonic motor (USM) 2 should be rotated. According to levels of the signals $V_D$ and $V_s$, the drive control circuit 23 outputs driving voltages $V_a$ and $V_b$ to oscillate the piezoelectric plates 4a and 4b so as to rotate the ultrasonic motor (USM) 2.

The program shutter 12 consists of a pair of sector like shutter blades 12a and 12b. Each sector blade 12a, 12b is formed with a cam slot 20a, 20b, respectively. The cam slots 20a and 20b intersect at their middle portions when the sector blades 12a and 12b overlay each other. A drive lever 19 pivotally mounted on the structure of the camera is integrally formed with a sector with threads formed on one side thereof and an arm 19b having a drive pin 18. The drive pin 18 is received in both of the cam slots 20a and 20b. The threaded sector 19a is in mesh with the idler gear 13 which is, as was previously described, in mesh with the drive gear 11. When the idler gear 13 is rotated in the counterclockwise direction as viewed in FIG. 2, the sector blades 12a and 12b are moved apart from each other, so as to open the program shutter 12. Otherwise, when the idler gear 13 is rotated in the clockwise direction as viewed in FIG. 2, the sector blades 12a and 12b are moved close to each other, so as to close the program shutter 12.

Figure 3:
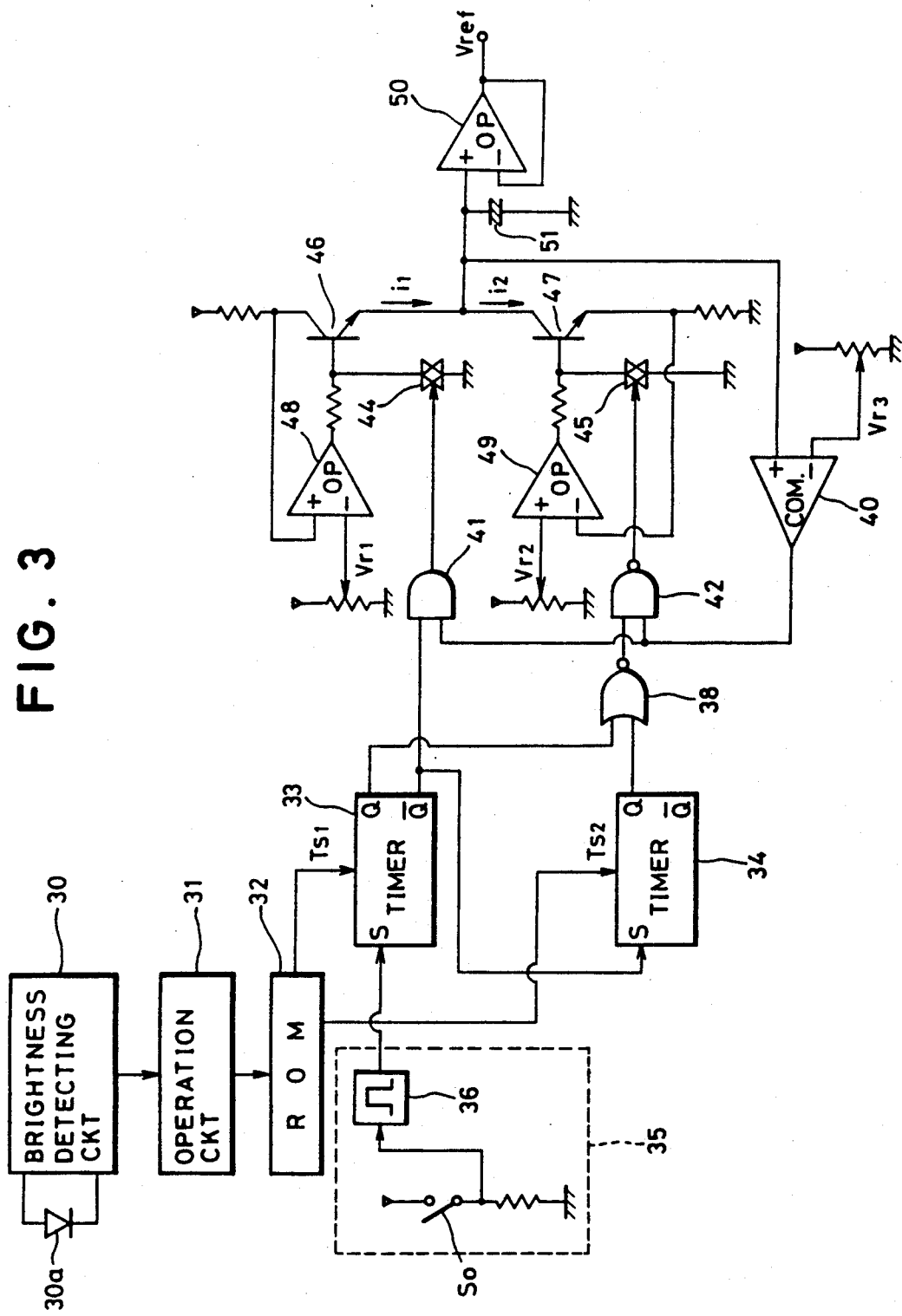
FIG. 3 is a block diagram illustrating a position signal generating circuit in accordance with a preferred embodiment of the present invention.

Referring to FIG. 3, the position control signal generating circuit 22 which outputs the position control or position reference signal $V_{ref}$ is shown, consisting of a brightness detecting circuit 30 for detecting the brightness of a subject. The brightness detecting circuit 30 includes a photometric element 30a for converting light received thereby into a photoelectric current proportional to the intensity or amount of the received light. The brightness detecting circuit 30 outputs a brightness signal proportional to the brightness of the subject according to the photoelectric current from the photometric element 30a. An operational circuit 31 connected to the brightness detecting circuit 30 transforms the brightness signal into a logarithmic form and then a digital form. The operational circuit 31 encodes the logarithmically, digitally transformed brightness signal according to its signal level and outputs a brightness code signal to a ROM 32. The ROM 32 consists of a table memory wherein a programmed time table is stored. The time table carries combinations of time signals $Ts_1$ and $Ts_2$ corresponding to various code signals. Time signal $Ts_1$ represents a time T1 for which the shutter 12 is driven to open to a desired aperture and time signal $Ts_2$ represents a time T2 for which the shutter 12 is kept open at the desired aperture.

First and second timer circuits 33 and 34 start counting the time T1 and T2 upon receiving start signals at input terminals S, respectively. Each timer circuit 33 or 34 outputs a high (H) level signal from an output terminal Q, respectively. The first timer circuit 33 receives a start signal from a start signal generator circuit 35. The start signal generator circuit 35 consists of an on-off switch $S_0$ and a waveform shaping circuit 36. The on-off switch $S_0$ cooperates with a shutter lease member (not shown) and is on to output the start signal when the shutter release member is operated to make an exposure. The waveform shaping circuit 36 prevents the start signal from distortion possibly caused due to chattering of the on-off switch $S_0$. The input terminal S of the second timer circuit 34 is connected to an output terminal $\overline{Q}$ of the first timer circuit 33.

The output terminals Q of the first and second timer circuits 33 and 34 are connected to a NOR gate 38. Output of the NOR gate 38 is connected to a NAND gate 42 to which as output of the comparator 40, which will be described in detail later is also connected. The output terminal Q of the first timer circuit 33 is connected to an AND gate 41 to which connected is the output of the comparator 40. Outputs from the AND gate 41 and the NAND gate 42 cause first and second analog switches 44 and 45 to turn on or off, respectively. That is, when both of the AND gate 41 and the NAND gate 42 output high (H) level signals, the analog switches 44 and 45 are on.

The analog switches 44 and 45 are connected to base terminals of transistors 46 and 47, respectively. The transistors 46 and 47 are, respectively, connected with outputs of operational amplifiers 48 and 49 at their base terminals. When the analog switch 44 is off, the transistor 46 is rendered conductive, allowing a constant current $i_1$ to flow therethrough from the collector to emitter. Similarly, when the analog switch 45 is off, the transistor 47 is rendered conductive, allowing a constant current $i_2$ to flow therethrough from the collector to emitter. These constant currents $i_1$ and $i_2$ are, respectively, depending on the output voltages of the operational amplifiers 48 and 49 and adjustable by input voltages $V_{r1}$ and $V_{r2}$ to the operational amplifiers 48 and 49 at their inverted input terminals.

A juncture between the emitter and collector of the transistors 46 and 47 is connected to a non-inverted input terminal of an operation amplifier 50. The input line of the operational amplifier 50 is connected with a condenser 51 parallel to the transistor 47. Terminal voltage of the condenser 51 is amplified by the operational amplifier 50 and is used as the position reference voltage $V_{ref}$. The terminal voltage of the condenser 51 is also applied to a non-inverted terminal of a comparator 40. When the terminal voltage is higher than a threshold voltage $V_{r3}$, the comparator 40 outputs a high (H) level signal.

Figure 4:
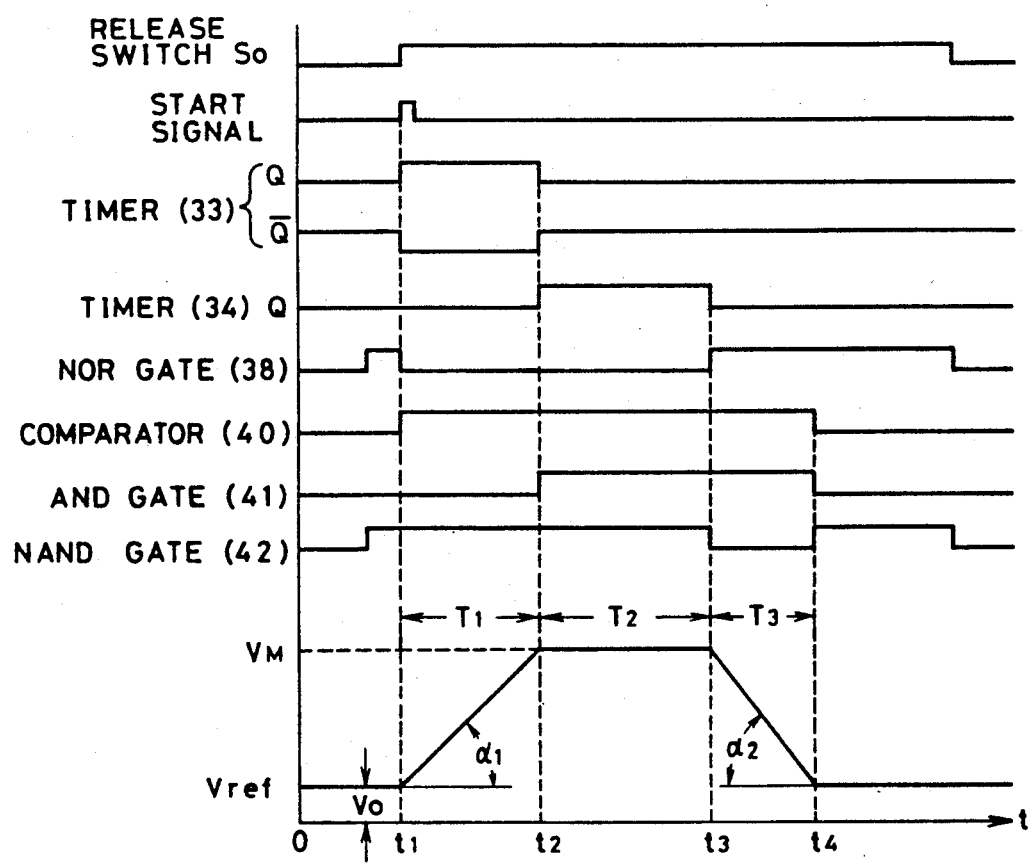
FIG. 4 is a time chart illustrating various signals generated by the position signal generating circuit shown in FIG. 3.

The operation of the position control signal generating circuit 22 illustrated in FIG. 3 is best understood by reviewing FIG. 4, which is a time chart illustrating various signals generated from the various circuits of the position control signal generating circuit 22. As soon as the release switch is turned on, subject brightness detection is carried out. According to the result of the subject brightness detection, ROM 32 provides time signal $Ts_1$ and $Ts_2$ and sends them to the first and second timer circuits 33 and 34, respectively. Simultaneously, the waveform shaping circuit 36 provides a start signal and sends it to the terminal S of the first timer circuit 33. Then, the timer circuit 33 starts counting the time T1 determined by the time signal $Ts_1$. During the count of the time T1, the first timer circuit 33 presents a high (H) level signal at the Q terminal and a low (L) level signal at the $\overline{Q}$ terminal. At this time, the second timer circuit 34 presents a low (L) level signal at the $\overline{Q}$ terminal. At a reset condition or initial condition, the position control signal generating circuit 22 will assume its state to output the position reference voltage $V_{ref}$ of $V_0$ and the condenser 51 will assume a to present terminal voltage lower than the threshold voltage $V_{r3}$, and therefore, the comparator 40 presents a low (L) level signal at its output terminal.

When the timer circuit 33 outputs a low (L) level signal at the $\overline{Q}$ terminal, the AND gate 41 provides a low (L) level signal, whereby the analog switch 44 turns off so as to turn the transistor 46 conductive. Thus, a constant current $i_1$ corresponding to the output of the operational amplifier 48 flows from transistor 46. At this time, since the transistor 47 is, however, rendered nonconductive, the condenser 51 is charged with the constant current $i_1$ and the terminal voltage of the condenser 51 gradually rises. Charging the condenser 51 causes the terminal voltage to become over the initial output voltage $V_0$ of the position control signal generating circuit 22. This causes the comparator 40 to output a high (H) level signal while the first timer circuit 33 maintains a low (L) level signal at the $\overline{Q}$ terminal, whereby the AND gate 41 keeps a low (L) level signal at its output terminal, so that the charging of the condenser 51 is effectively continued.

As the terminal voltage of the condenser 51 rises, the output of the operation amplifier 50 as a position reference voltage $V_{ref}$ rises at an angle $\alpha_1$ starting from the initial voltage $V_0$. At the time the first timer circuit 33 counts up the time T1, the first timer circuit 33 provides a high (H) level signal at its $\overline{Q}$ terminal and, as a result, the AND gate 41 outputs a high (H) level signal, turning on the analog switch 44 so as to turn the transistor 46 nonconductive. The angle $\alpha_1$ depends on the voltage $V_{r1}$ applied to the operational amplifier 48 at the inverted input terminal.

Immediately after the counting up of the time T1, the second timer circuit 34 starts counting the time T2 and presents a high (H) level signal at its Q terminal. At this time, a low (L) level signal is presented at the Q terminal of the first timer circuit 33, the NOR gate 38 maintains a low (L) level signal at its output terminal. This low (L) level signal from the NOR gate 38 is sent, as one of two inputs, to the NAND gate 42, the NAND gate 42 maintains its high (H) level signal unchanged, whereby the analog switch 45 is still on. Until the second timer circuit 34 counts up the time T2, both of the analog switches 44 and 45 are on, both of the transistors 46 and 47 are rendered nonconductive, leaving the condenser 51 neither to be charged nor to discharge so as to maintain the terminal voltage at a certain value.

At the moment the second timer circuit 34 counts up the time T2, it provides a low (L) level signal at the Q terminal which is sent to the NOR gate 38. The NOR gate 38 provides a high (H) level signal and the NAND gate 42 provides a low (L) level signal. As a result, the analog switch 45 turns off to make the transistor conductive, but the analog switch 44 is kept on, leaving the transistor 46 to be non-conductive. In this state or condition, the condenser 51 causes the discharge of current $i_2$ and the current $i_2$ flows through the transistor 47 from the collector to the emitter. With the laps of time, the terminal voltage of the condenser 51 will gradually decline at an angle $\alpha_2$, causing a gradual drop of the output voltage as a position control or position reference voltage $V_{ref}$ of the operational amplifier 50. It will be apparent that the angle $\alpha_2$ of inclination, depends on the voltage $V_{r2}$ to the operational amplifier 49.

When the terminal voltage of the condenser 51 reaches lower than the threshold voltage $V_{r3}$ of the comparator 40, the comparator 40 provides a low (L) level signal at its output terminal and sends it to the NAND gate 42. Then, the NAND gate 42 provides a high (H) level signal. The low (L) level signal causes the analog switch to turn on, changing the transistor 37 nonconductive. As a result, a trapezoidal waveform of position reference voltage $V_{ref}$ is obtained. Although, in this embodiment, the maximum position control voltage $V_M$ representing the aperture of the program shutter 12 is controlled as a function of time, it can be done to control directly the position reference voltage $V_{ref}$.

The position control or position reference voltage $V_{ref}$ from the position control signal generating circuit 22 and the position signaling voltage $V_p$ from the position sensor 20 are both sent to the control circuit 23.

Figure 5:
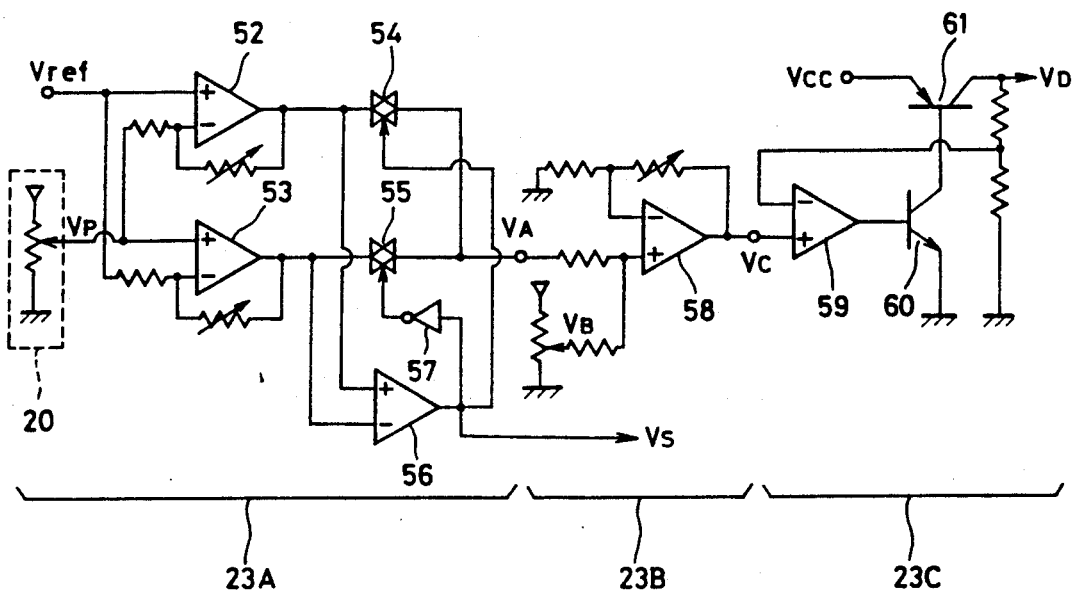
FIG. 5 is a block diagram illustrating a control circuit of the system control circuit shown in FIG. 2.

Referring to FIG. 5, the control circuit 23 is shown, consisting of a comparator circuit section 23A, a summing circuit section 23B and a stabilization circuit section 23C. The comparator circuit section 23A includes a pair of operational amplifiers 52 and 53 to which the position control or position reference voltage $V_{ref}$ and the position signaling voltage $V_p$ are input, respectively. The operational amplifiers 52 and 53 are connected at their output terminals to analog switches 54 and 55, respectively, and also a comparator 56. The analog switch 54 is controlled directly by means of an output of the comparator 56 and the analog switch 55 is controlled by an inverted output of the comparator 56 through an inverter 57. The comparator 56 compares the outputs from the operational amplifiers 52 and 53 and provides a high (H) level signal or a low (L) level signal according to the result. The output from the comparator 56 is the direction signal $V_s$ in voltage representing a direction of rotation in which the ultrasonic motor (USM) 2 should be rotated. If the direction signal voltage $V_s$ is high (H) level, the drive circuit 24 causes the ultrasonic motor (USM) 2 to turn in a normal direction in which the program shutter 12 is driven to open. Otherwise, if the direction signal voltage $V_s$ is low (L) level, the drive circuit 24 causes the ultrasonic motor (USM) 2 to turn in the reverse direction in which the program shutter 12 is driven to close.

The summing circuit section 23B comprises an operational amplifier 58 which adds a base voltage $V_B$ to either one of the outputs voltages from the operational amplifiers 52 and 53 that is larger between the two and amplifies the added resulting voltage. An output from the operational amplifier 58 is transmitted to the stabilization circuit section 23C comprising an amplifier 59 and transistors 60 and 61. The transistor 60 is connected to the output of the operational amplifier 59 at its base and the transistor 61 is connected to the collector of the transistor 60 at its base. The stabilization circuit section 23C outputs a speed control signal voltage $V_D$ according to the input voltage from the summing circuit section 23B.

In the control circuit 23, the comparator circuit section 23A amplifies a larger one of the outputs from the amplifiers 52 and 53 that are the absolute differences between the position reference voltage $V_{ref}$ and position signaling voltage $V_p$ with a gain $a_1$ thereof and provides an output voltage $V_A$. The output voltage $V_A$ is added together to the base voltage $V_B$ and then amplified with a gain $a_2$ to an output voltage $V_C$ in the summing circuit section. Finally, the output voltage $V_C$ from the summing circuit section 23B is amplified with a gain $a_3$ in the stabilization circuit section 23C to an output voltage $V_D$ as a speed control signal. The respective output voltages $V_A$, $V_C$ and $V_D$ are explained as follows:

$$V_A = a_1 \cdot |V_{ref} - V_p|$$

$$V_C = a_2 \cdot (V_A + V_B)$$

$$V_D = a_3 \cdot V_C$$

Figure 6:
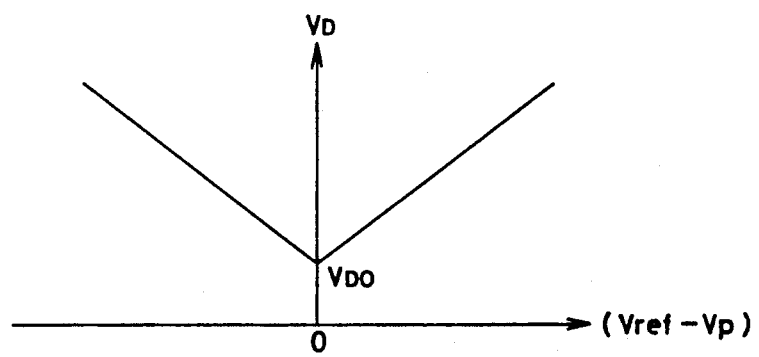
FIG. 6 is a graph showing an output level of a drive voltage from the control circuit shown in FIG. 5.

The final output voltage $V_D$ is graphed as illustrated in FIG. 6. When the absolute difference is zero (0), it represents an initial voltage $V_{D0}$ which is too low for the ultrasonic motor (USM) 2 to cause rotation.

Figure 7:
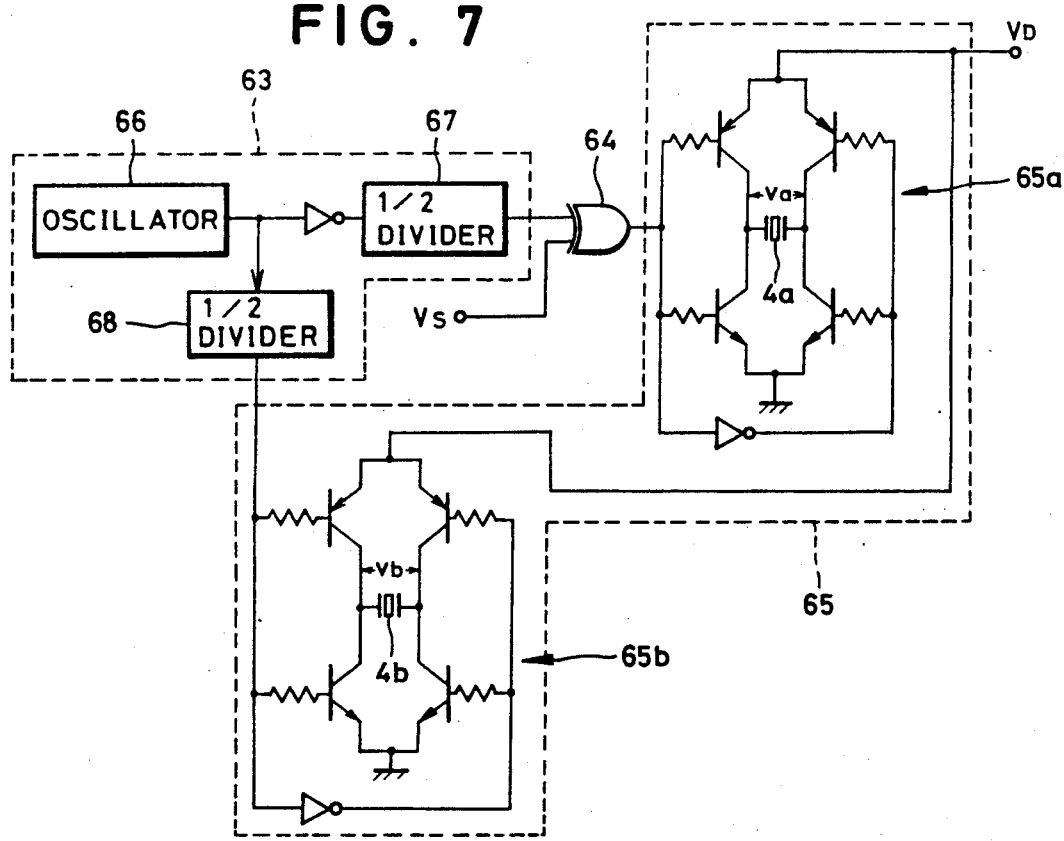
FIG. 7 is a block diagram illustrating a drive circuit of the system control circuit shown in FIG. 2.

The direction signal voltage $V_s$ and the speed control signal voltage $V_D$ from the control circuit 23 are input to the drive circuit 24 shown in detail in FIG. 7. As shown, the drive circuit 24 comprises a clock pulse generator section 63, an exclusive OR gate 64 and a drive circuit section 65. The clock pulse generator section 63 includes an oscillator 66, frequency dividers 67 and 68 and an inverter 69. The frequency dividers 67 and 68 generate clock pulses whose phase is shifted 90 degrees from each other. The exclusive OR gate 64 advances a clock pulse from the frequency divider 67, 90 degrees when the signal voltage $V_s$ is high (H) level, and retards it 90 degrees when the signal voltage $V_s$ is low (L) level.

The drive circuit section 65 comprises a pair of push-pull circuits 65a and 65b, each consisting of transistors, resistances and an inverter. The push-pull circuits 65a and 65b receive the speed control signal voltage $V_D$ from the control circuit 23 and, correspondingly to the speed control signal voltage $V_D$, provide the drive voltages $v_a$ and $v_b$ to be applied to the piezoelectric plates 4a and 4b of the ultrasonic motor (USM) 2.

In the operation of the program shutter driving system comprising the above described circuit, before the drive system is powered, the ultrasonic motor (USM) 2 rests at its initial position. When the drive system is powered, the position sensor 20 provides a voltage $V_0$ as the position signal $V_p$ and the control circuit 23 provides the initial voltage $V_{D0}$ which is the base voltage $V_B$ of the operational amplifier 58 of the control circuit 23. This initial voltage $V_{D0}$ is too low for the ultrasonic motor (USM) 2 to causes rotation that, contributes to a quick start of the ultrasonic motor (USM) 2.

At the moment the release switch $S_0$ is turned on, the ROM 32 provides the first and second timer circuits 33 and 34 with time signals $T_{s1}$ and $T_{s2}$, respectively, according to a brightness code corresponding to the instant subject brightness. Simultaneously, the position control signal generating circuit 22 provides a position reference signal voltage $V_{ref}$ which changes with time.

The opening and closing of the shutter 12 is programmed as shown in FIG. 4. That is, between a time $t_1$ at which the release switch $S_0$ is turned on and a time $t_2$, the position reference signal voltage $V_{ref}$ increases with time, allowing the program shutter 12 to continuously open with changing its aperture. Between times $t_2$ and $t_3$, the aperture size of the program shutter 12 is kept unchanged. When time $t_3$ is reached, the program shutter 12 gradually closes. At a time $t_4$, the program shutter 12 fully closed. It is of course that the shutter 12 is programmed to closed immediately after it has opened to its maximum controlled size of aperture.

With a rising of the position reference voltage $V_{ref}$ at an angle $\alpha_1$, the position reference voltage $V_{ref}$ will become larger than the position signal voltage $V_p$. If in fact the position reference voltage$_{ref}$ becomes larger than the position signal voltage $V_p$, the comparator 56 outputs a high (H) level signal as the direction signal $V_s$ and the analog switch 54 turns on. An output voltage $V_A = a_1 \cdot (V_{ref} - V_p)$ presents at the output of the operational amplifer 52. As a result, a drive voltage $V_D$, which is larger than the initial voltage $V_{D0}$, is obtained. Responding to the inputting of the drive voltages $V_D$ and the direction signal voltage $V_s$, the push-pull circuits 65a and 65b of the drive circuit 24 are actuated to apply drive voltages $v_a$ and $v_b$ to the piezoelectric plates 4a and 4b so as to vibrate them. These drive voltages have amplitudes proportional to the drive voltage $V_D$. Because the voltage $v_a$ is advanced in phase by 90 degrees relative to the voltage $v_b$, the piezoelectric plates 4a and 4b produces such electrorestictive effect as to mechanically cause vibrations of the projections of the elastic rotatable body 5 so as to rotate the elastic rotatable body 5 in the normal direction. The rotation of the elastic rotatable body 5 is transmitted to the drive lever 19 through the gears 11 and 13, moving or turning the shutter blades 12a and 12b so as to start opening the shutter 12 for making an exposure.

As the ultrasonic motor (USM) 2 rotates in the normal direction, the position sensor 20 provides a position signaling voltage $V_p$ corresponding to the rotated angular of the ultrasonic motor (USM) 2 and feeds back it to the control circuit 23, keeping the drive voltage $V_D$ at a substantially constant level.

At the time $t_2$, the position reference voltage Vre reaches constant according to the aperture size of the shutter 12. Between the times $t_2$ and $t_3$, the difference between the voltage $V_p$ is zero (0), and the drive voltage $V_{D0}$ is applied to position reference voltage $V_{ref}$ and the position signaling the drive circuit 24, whereby the ultrasonic motor (USM) 2 does not rotate.

After the time $t_3$, the position reference voltage $V_{ref}$ starts falling at an inclination rate or an angle $\alpha_2$ and becomes smaller than the position signaling voltage $V_p$. As a result, a low (L) level signal presents at the output of the comparator 56, causing the analog switches 54 and 55 to turn off and on, respectively, whereby the drive voltage $V_D$ becomes proportion to the difference between the position signaling voltage $V_p$ and the position reference voltage $V_{ref}$ ($V_p - V_{ref}$).

When a low (L) level signal as the direction signal voltage $V_s$ is applied to the exclusive OR gate 64, the clock pulse from the frequency divider 67 is delayed 90 degrees in phase relative to that from the frequency divider 68. Thus, the piezoelectric plates 4a and 4b produces such electrorestictive effect as to mechanically cause vibrations of the projections of the elastic rotatable body 5 so as to rotate the elastic rotatable body 5 in the reverse direction. The rotation of the elastic rotatable body 5 is transmitted to the drive lever 19 through the gears 11 and 13, moving or turning the shutter blades 12a and 12b so as to start closing the shutter 12 for finishing the exposure. At the time $t_4$, the shutter blades 12a and 12b fully close to complete the exposure.

The shutter 12 opens and closes following a change of position reference signal voltage $V_{ref}$ provided from the position control signal generating circuit 22 in comparison with a position signaling voltage $V_p$ generated corresponding to the rotated angular position of the ultrasonic motor (USM) 2. Therefore, the shutter 12 can perform exactly programmed operations, so as to make exposures with a high reproducibility. The rate or inclination angle $\alpha_1$ and $\alpha_2$ can be easily adjusted by changing the input voltages $V_{r1}$ and $V_{r2}$ of the operational amplifiers 48 and 49 of the position control signal generating circuit 22, respectively. Therefore, if the operational amplifiers 48 and 49 are so constructed as to change their input voltages $V_{r1}$ and $V_{r2}$, the shutter 12 can be desirably programmed to operate differently. In this case, it is of course to store data of times $T_1$ and $T_2$ corresponding to various input voltages $V_{r1}$ and $V_{r2}$.

Figure 8:
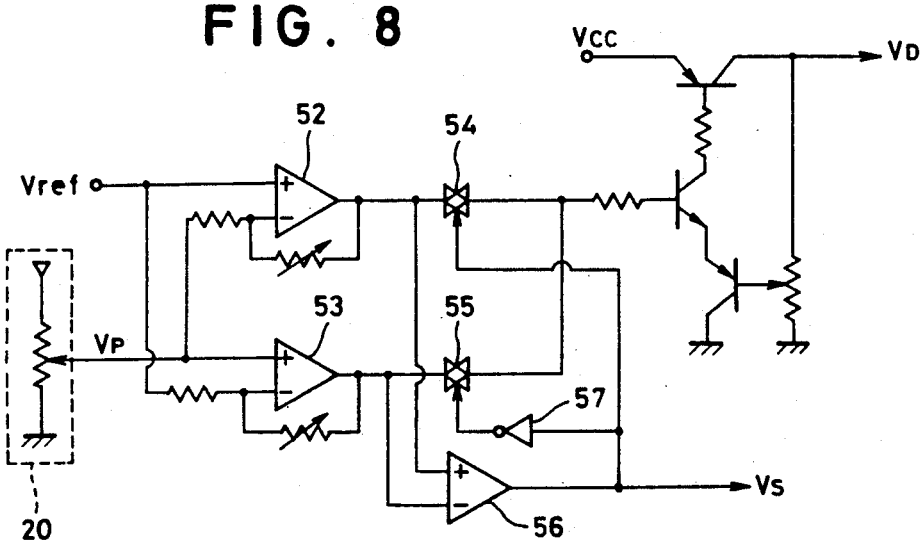
FIG. 8 is a block diagram showing a variant of the control circuit of the system control circuit shown in FIG. 2.

If desired, it is permissible to construct the control circuit 23 so as to provide no signal voltage when the ultrasonic motor (USM) 2 is at its initial position. One such construction of the control circuit is shown in FIG. 8.

Figure 9:
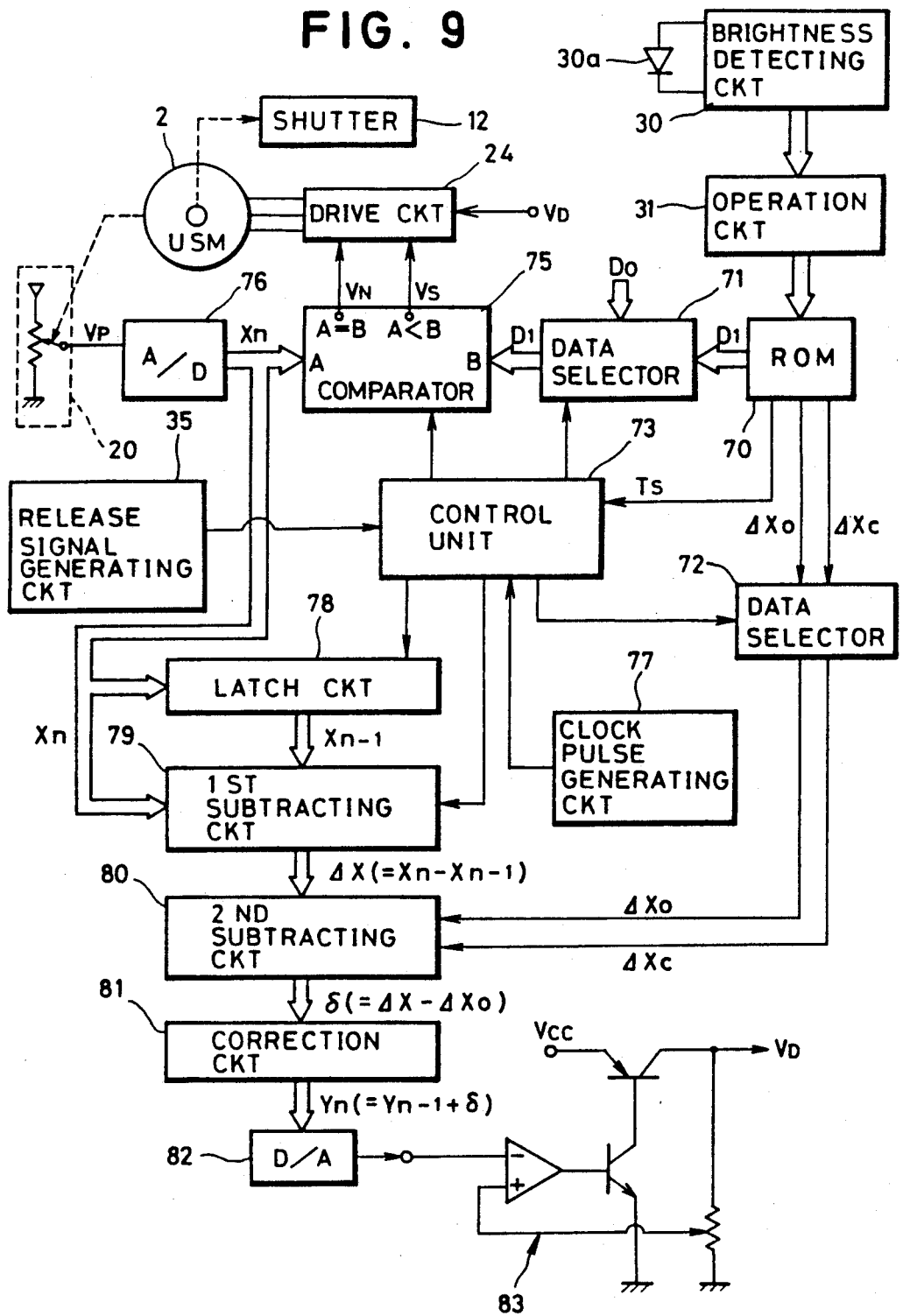
FIG. 9 is a block diagram, similar to FIG. 3, illustrating a position signal generating circuit in accordance with another preferred embodiment of the present invention.

Referring to FIG. 9, a program shutter drive system in accordance with another preferred embodiment of the present invention is shown, being so modified as to control the rotation of an ultrasonic motor (USM) based on a rotated angular position and a speed of rotation at the rotated angular position. In this embodiment, the same circuits as described and denoted, respectively, by reference numbers 24, 30, 31, 35 in the previous embodiment are employed and an on-off control signal voltage $V_N$ as well as the drive voltage $V_D$ is applied to the control circuit 24.

As shown, the brightness detecting circuit 30 outputs a brightness signal proportional to the brightness of the subject. The operational circuit 31 connected to the brightness detecting circuit 30 transforms the brightness signal into a logarithmic form and then a digital form and encodes the logarithmically, digitally transformed brightness signal according to its signal level and outputs a brightness code signal to a ROM 70. The ROM 70 consists of a table memory wherein position signals $D_1$ indicating maximum sizes of the shutter 12 corresponding to various brightness code signals are carried, and a memory wherein speed signals $\Delta X_O$ and $\Delta X_C$ indicating basic speeds of rotation pf the ultrasonic motor (USM) 2 for, respectively, opening and closing the shutter 12. First and second data selectors 71 and 72 are connected to the ROM 70. A position indicating signal $D_1$ is transmitted in a digital form to the first data selector 71 and speed signals $\Delta X_O$ and $\Delta X_C$ are transmitted in a digital form to the second data selector 72. The ROM 70 further provides a controller 73 with a time signal $T_s$ indicating a period of time T. The controller, which consists of a central processing unit (CPU), generates synchronizing signals which cause the first and second data selectors 71 and 72 to send a position indicating signal $D_1$ and speed signals $\Delta X_O$ and $\Delta X_C$ to necessary parts of the drive system.

A comparator 75 has input terminals A and B which, respectively, receive a position indicating signal $D_1$ through the first data selector 71 and a position signal $X_n$ in a digital form into which a position signal $V_p$ from the position sensor 20 is transformed by means of an A/D converter 76. The comparator 75 compares the position signal $X_n$ and $D_1$ and provides a high (H) level signal voltage $V_s$ when the position indicating signal $D_1$ is smaller than the position signal $X_n$ or a high (H) level on-off control signal voltage $V_N$ when the position indicating signal $D_1$ is equal to the position signal $X_n$.

The position signal $X_n$ is changed in voltage in synchronism with the frequency of a clock-pulse generated by means of a clock-pulse generator 77 to position signals $X_1, X_2, \ldots, X_{n-1}$ and $X_n$. The position signal $X_n$ is sent to a latch circuit 78 and a first subtracting circuit 79. The latch circuit 78 latches a (n−1)th position signal $X_{n-1}$. The first subtracting circuit 79 calculates $\Delta X = X_{n-1} - X_n$.

A second subtracting circuit 80 is connected to the first subtracting circuit 70 and calculates a signal indicating the difference of speed of rotation which is the difference between the $\Delta X$ from the first subtracting circuit 70 and the speed signal $\Delta X_O$ or $\Delta X_C$ from the second data selector 72. The speed difference signal $\delta$ is sent to a correcting circuit 81 which calculates $Y_n = Y_{n-1} + \delta$. The resulting output $Y_n$ is sent to a D/A converter 82 and transformed into a voltage in an analog form.

An voltage stabilization circuit 83 is connected to the output of the D/A converter 82 and provides a drive voltage $V_D$ corresponding to the output $Y_n$. The drive voltage $V_D$ is sent to the drive circuit 24 and used for controlling the ultrasonic motor (USM) 2 shown in FIG. 2.

The operation of the program shutter drive system shown in FIG. 9 is best understood by reviewing FIG. 10, which is a time chart illustrating various signals generated from the various circuits or elements. When a release signal is generated from the brightness detecting circuit 30 and sent to the control unit 73, a position indicating signal $D_1$, a time signal $T_s$, and speed signals $\Delta X_O$ and $\Delta X_C$, which are restrictively corresponding to the detected subject brightness, are retrieved from the ROM 70 and transmitted to both of the first and second data selectors 71 and 72 and the control unit 73. These signals define a programmed operation of the shutter 12 as shown in FIG. 10A.

At the presence of the release signal, the control unit 73 causes the first data selector 71 to transmit the position indicating signal $D_1$ to the comparator 75. Since the position indicating signal $D_1$ is, at this moment, not equal to the position signal $X_n$ and the on-off control signal voltage $V_N$ of the comparator 75 is low, the drive circuit 24 is active and receives a drive voltage $V_D$ from the voltage stabilization circuit 83, causing the ultrasonic motor (USM) 2 to rotate in the normal direction.

With the rotation of the ultrasonic motor (USM) 2, the position signal $V_p$ from the position sensor 20 gradually rises from the initial position signal $D_O$ and is transformed into a digital position signal $X_n$ by the A/D converter 76. Then, the digital position $X_n$ is transmitted to the comparator 75. The comparator 75 outputs a high (H) level direction signal voltage $V_s$ when the position indicating signal $D_1$ is larger than the position signal $X_n$. With this high (H) level direction signal $V_s$, the drive circuit 24 causes the ultrasonic motor (USM) 2 to turn in the normal direction to open the shutter 12.

Figure 10A:
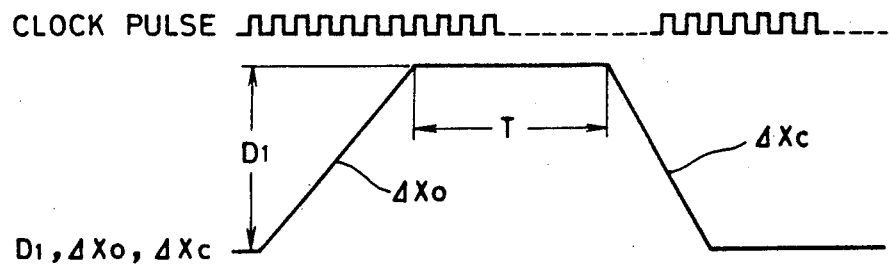
FIG. 10 is a time chart illustrating various signals generated by the position signal generating circuit shown in FIG. 9.
Figure 10B:
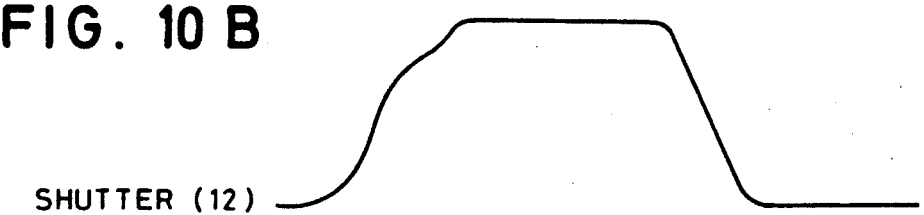
Figure 10C:
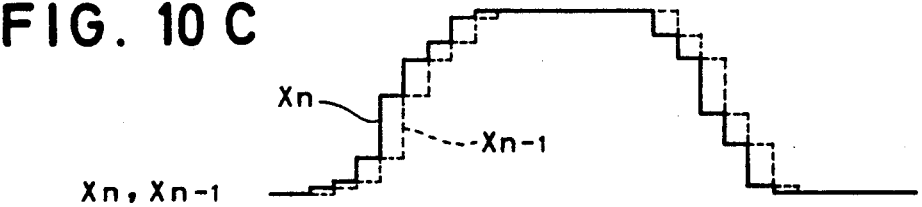
Figure 10D:
Figure 10E:
Figure 10F:
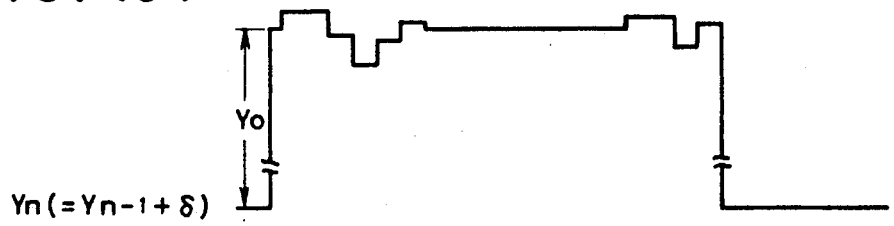

With the rotation of the ultrasonic motor (USM) 2 in the normal direction, the position signal $X_n$ rises stepwise. If the shutter 12 continuously but irregularly opens as shown in FIG. 10B, the position signal $X_n$ will increase stepwise as shown in FIG. 10C. The position signal $X_n$ is latched by the latch circuit 78 for one cycle of the clock pulse and then sent as a position signal $X_{n-1}$ to the first subtracting circuit 79. The first subtracting circuit 79 calculates the difference $\Delta X$ between the adjacent position signals $X_{n-1}$ and $X_n$ which are renewed at the frequency of the clock pulse as is shown in FIG. 10D. The difference $\Delta X$ means a differentiated output of the position signal $X_n$ or a changing rate of the position signal $X_n$ per unit time or one cycle of the clock pulse and is equivalent to the speed of rotation of the ultrasonic motor (USM) 2.

The second subtraction circuit 80 calculates the speed difference signal based on the $\Delta X$ from the first subtracting circuit 70 and the speed signal $\Delta X_O$ through the second data selector 72. The speed difference signal corresponds to the difference between a reference speed stored in the ROM 70 and an actual speed of the ultrasonic motor (USM) 2. If the difference is plus (+), this indicates that the ultrasonic motor (USM) 2 is actually rotating at a speed higher than the reference speed. Otherwise, if the difference is minus (−), this indicates that the ultrasonic motor (USM) 2 is actually rotating at a speed lower than the reference speed.

The speed difference signal $\delta$ is applied as a correcting factor to the correction circuit 81 every clock pulse. The correction circuit 81 provides a corrected output $Y_n$ which is obtained by correcting the latest output $Y_{n-1}$ with the correcting factor and used to adjust the actual speed of rotation to a speed indicated by the speed signal $\Delta X_O$. By applying the corrected output $Y_n$ to the voltage stabilization circuit 83 through the D/A converter 82, a drive voltage $V_D$ that is suitable to adjust the actual speed of rotation of the ultrasonic motor (USM) 2 to the speed indicated by the speed signal $\Delta X_O$ is provided and applied to the drive circuit 24. The shutter 12 opens following the programmed aperture size shown in FIG. 10A. An initial corrected output $Y_0$ is set to a value to provide the initial drive voltage $V_{D0}$.

With the opening of the shutter 12, the position signal $X_n$ becomes equal to the position indicating signal $D_1$. Upon this, the comparator 75 outputs a high (H) level on-off control signal voltage $V_N$ and a low level direction signal $V_s$, whereby the drive circuit 24 controls the ultrasonic motor (USM) 2 to stop its rotation, letting the shutter 12 standstill while the control unit 73 counts the time T. After the laps of the time T, the control unit 73 causes the comparator 75 to output a low level on-off control signal voltage $V_N$ and the second selector 72 to feed the speed signal $\Delta X_C$ to the second subtracting circuit 80.

Thereafter, the control unit 73 actuates the latch circuit 78, the first and second subtraction circuits 79 and 80, the correction circuit 81. In the same manner as described above, the voltage stabilization circuit 83 outputs a drive voltage $V_D$ and sends it to the drive circuit 24. At this time, the comparator 75 outputs a low level direction signal $V_s$ and the ultrasonic motor (USM) 2 rotates in the reverse direction at a speed indicated by the speed signal $\Delta X_C$. Thus, the shutter 12 closes so as to finish an exposure. Because the control of rotation of the ultrasonic motor (USM) 2 is performed by using not only the rotated angular position of the ultrasonic motor (USM) 2 but also of the speed of rotation, an exact operation control of the shutter 12 is effected.

Referring to FIG. 11, a program shutter drive system in accordance with still another preferred embodiment of the present invention is shown, being so modified as to control digitally the rotation of an ultrasonic motor (USM). In this embodiment, the same circuits as described and denoted, respectively, by reference numbers 24, 30, 31, 35 in the previous embodiments are employed and on-off control signal $V_N$ and direction signal $V_s$, as well as the drive voltage $V_D$, are applied to the control circuit 24. As shown, a monitor 84 is provided in association with the ultrasonic motor (USM) 2 and constantly monitors the rotation of the ultrasonic motor (USM) 2 to verify the accuracy of the operation of the shutter 12. The monitor 84 consists of a chopper disk 85 rotationally cooperating with the ultrasonic motor (USM) 2. The chopper disk 85 is formed with a circular series of holes 85a arranged at regular angular intervals. A pair of photosensors 86a and 86b are disposed angularly spaced apart from each other so as to detect the holes 85a of the chopper disk 85. Photoelectric outputs of the photosensors 86a and 86b are connected to an encoder 87. A ROM 88 consists of a table memory wherein position signals $D_1$ indicating maximum sizes of the shutter 12 corresponding to various brightness code signals, time signals T and speed signals W are carried. The encoder 87 outputs an direction signal representing a direction in which the ultrasonic motor (USM) 2 should rotate and pulses having a frequency proportional to the rotation of the ultrasonic motor (USM) 2 according to the photoelectric outputs from the photosensors 86a and 86b. These signals are applied to a counter 90. When the ultrasonic motor (USM) 2 rotates in the normal direction, the counter 90 counts additively the pulses. Otherwise, when the ultrasonic motor (USM) 2 rotates in the reverse direction, the counter 90 counts subtractively the pulses. Counted value N of the counter 90 is transmitted to a comparator 91.

The comparator 91 compares the count value N input to its A terminal with a position signal $D_1$ or a initial position signal $D_0$ input to its B terminal through a data selector 92. The comparator 91 outputs a high (H) level direction signal $V_s$ if the count value N is smaller than the position signal $D_1$ or the initial position $D_0$, or a high (H) level on-off control signal $V_N$ if the count value N is equal to the position signal $D_1$ or the initial position $D_0$. These direction signal $V_s$ and the on-off control signal $V_N$ are applied to the drive circuit 24 for controlling the rotation of the ultrasonic motor (USM) 2.

The direction signal $V_s$ is also used to actuate a timer 93 to count the time T indicated by a time signal $T_s$ from the ROM 88. The timer 93 is connected to a mono-multivibrator (which will be hereinafter referred to as an MM circuit) 94 which outputs a pulse having a certain pulse width when the counter 93 counts up the time T. The rising edge of the pulse sets the flip-flop (which will be hereinafter referred to as a FF) circuit 95. A high (H) level signal presented at Q terminal of the FF circuit 95 is applied to a data selector 92 so as to selectively transmit the position signal $D_1$ and $D_0$ to the comparator 91. An MM circuit 96 is provided to reset the FF circuit 95 when receiving a signal from the release signal generator circuit 35.

The encoder 87 sends pulses also to MM circuit 97 of which the Q and $\overline{Q}$ terminal are connected to a latch circuit 98 and a counter 100, respectively. The counter 100 is fed with a speed signal W in a digital form from the ROM 88 and a clock pulse from an oscillator 101. After the presence of a high (H) level output at the $\overline{Q}$ terminal of the MM circuit 97, the counter 100 starts to count down the speed signal W with the clock pulses. The latch circuit 98, upon recurring a high (H) level signal from the Q terminal of the MM circuit 97, latches the count value of the counter 100 and outputs an output $\Delta X$ representing a correction value. A correction circuit 102 connected to the latch circuit 98 calculates $Y_n = Y_{n-1} + \Delta X$. The resulting output $Y_n$ is sent to a voltage stabilization circuit 83 through a D/A converter 103. Therefore, the voltage stabilization circuit 83 provides a drive voltage $V_D$ corrected by the correction value $\Delta X$ and sends it to the drive circuit 24.

The operation of the program shutter drive system shown in FIG. 11 is best understood by reviewing FIGS. 12A through 12L, which is a time chart illustrating various signals generated from the various circuits or elements. When a release signal is generated from the brightness detecting circuit 35 and sent to the MM circuit 96, the FF circuit 95 is reset and outputs a low level signal to the data selector 92, causing the data selector 92 to transmit position signal $D_1$ from the ROM 88 to the comparator 91. Simultaneously, a time signal $T_s$, and a speed signal W are retrieved from the ROM 88 and transmitted to the timer 93 and the counter 100, respectively. These signals define a programmed operation of the shutter 12 shown in FIG. 12A.

At the presence of the release signal, since the position indicating signal $D_1$ is, at this moment, not equal to the count value N and the on-off control signal voltage $V_N$ of the comparator 91 is at a low level, the drive circuit 24 receives a drive voltage $V_D$ from the voltage stabilization circuit 83, causing the ultrasonic motor (USM) 2 to rotate in the normal direction. It is to be noted that the Initial drive voltage $V_{D0}$ is predetermined in the same way as in the previous embodiment.

Figure 12:
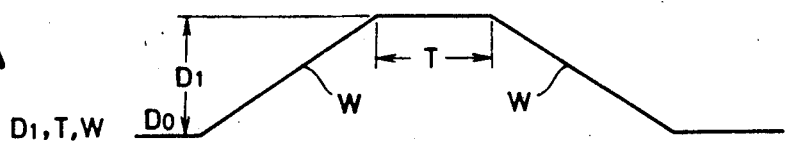
FIG. 12 is a time chart illustrating various signals generated by the position signal generating circuit shown in FIG. 11.
Figure 12:
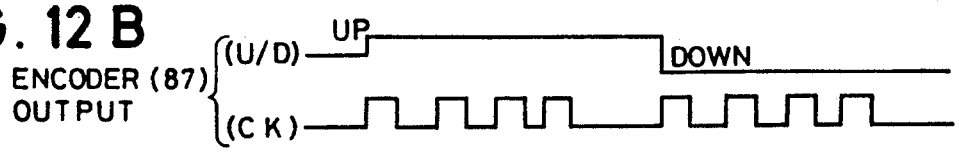
Figure 12:
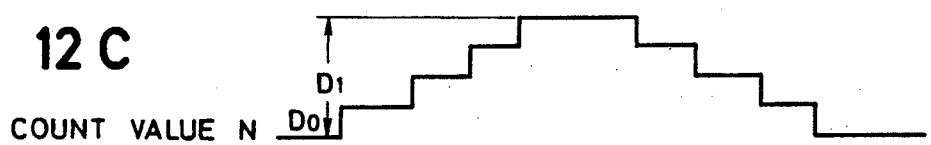
Figure 12:
Figure 12:
Figure 12:
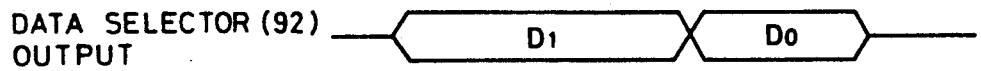
Figure 12:
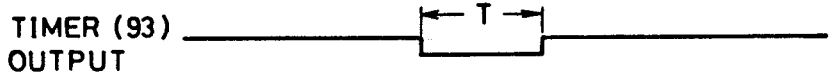
Figure 12:
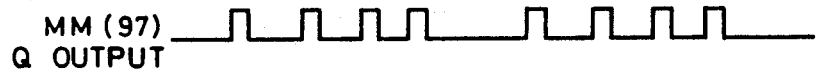
Figure 12:
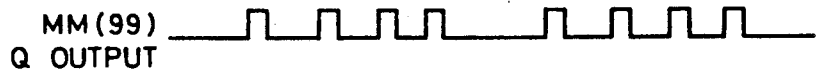
Figure 12:
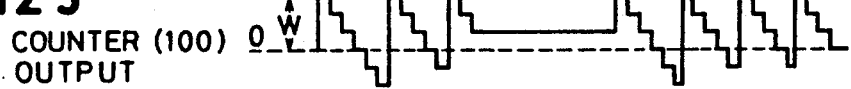
Figure 12:
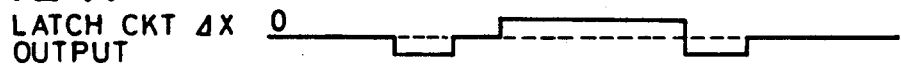
Figure 12:
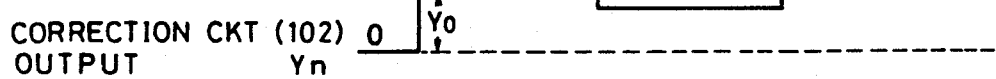

With the rotation of the ultrasonic motor (USM) 2, the encoder 87 generates pulses at intervals proportional to the speed of the chopper disk 85, and hence the ultrasonic motor (USM) 2, to open the shutter 12 and sends a high (H) level direction signal representing the direction in which the ultrasonic motor (USM) 2 rotates to the U/D terminal of the counter 90. The counter 90 additively count the pulses from the encoder 87. The count value N is compared with the position signal $D_1$ in the comparator 91. Until the count value reaches the position signal $D_1$, the comparator 91 outputs a high (H) level direction signal $V_s$, keeping the ultrasonic motor (USM) 2 to rotate in the normal direction. With the rotation of the ultrasonic motor (USM) 2 in the normal direction, the counter 90 continues to count the pulses and the count value N rises. At the beginning of rotation of the ultrasonic motor (USM) 2, the encoder 87 is apt to generate pulses at increased intervals due to an inertia effect as shown in FIG. 12B. Therefore, the rise of the count value N is gradual at the beginning of rotation of the ultrasonic motor (USM) 2.

The pulse from the encoder 87 is shaped to have a certain pulse width by means of the MM circuit 97 and transmitted to the latch circuit 98. The MM circuit 99 generates a pulse, which is delayed in phase by one pulse width from the pulse generated by the MM circuit 97, and sends it to the counter 100 (see FIGS. 12H and 12I).

Thus, the counter 100, as shown in FIG. 12J, starts to count down the speed signal with pulses generated from the oscillator 101 after the presence of a high (H) level signal at the $\overline{Q}$ terminal of the MM circuit 97. The count value of the counter is reset to the value of the speed signal W every time the counter 100 receives an output from the MM circuit 99. The value of the speed signal W is determined as a number that is counted down by a predetermined number of pulses from the oscillator 101.

The latch circuit 98 latches the count value of the counter at a timing of an output generated at the Q terminal of the MM circuit 97. The latch output $\Delta X$ shown in FIG. 12K is corresponding to a value of the speed signal W subtracted by an integrated value of the clock pulse from the oscillator 101 between each adjacent two high (H) level outputs at the Q terminal of the MM circuit 97. If the latch output $\Delta X$ is minus (−), this indicates that the actual speed of rotation of the ultrasonic motor (USM) 2 is slower than a speed of rotation indicated by the speed signal W. Otherwise, if the latch output X is plus (+), this indicates that the actual speed of rotation of the ultrasonic motor (USM) 2 is faster than a speed of rotation indicated by the speed signal W. The latch output ΔX is transmitted to the correction circuit 102 to provide a corrected output $Y_n$ every time a clock pulse is generated. This output $Y_n$, which is obtained by correcting the latest output corrected with the latch output ΔX, is used to adjust the actual speed of rotation of the ultrasonic motor (USM) 2 to the speed indicated by the speed signal W. The voltage stabilization circuits 83, when receiving the corrected output $Y_n$ through the D/A comparator 103, provides the drive motor (USM) 2 with a drive voltage $V_D$ for controlling the ultrasonic motor (USM) 2 to actually rotate at a speed indicated by the speed signal W, so that the shutter 12 operates substantially following an opening program shown in FIG. 12A.

When the shutter 12 opens to the size indicated by the position signal $D_1$, the count value N reaches to a value represented by the position signal $D_1$, causing the comparator 91 to output a high (H) level on-off control signal $V_N$ and a low level direction signal $V_s$, whereby drive circuit 24 causes the ultrasonic motor (USM) 2 to standstill, so that the shutter 12 stops at the aperture size. The timer 93 starts to count the time T at the presence of a low level direction signal $V_s$ (see FIG. 12G) while the shutter 12 is maintained at the aperture size. When the on-off control signal $V_N$ changes high, the oscillator 101 stops to generate pulse and the counter 101 interrupts counting.

When the timer 93 counts up the time T, it provides an output at the $\overline{Q}$ terminal and sends it to the MM circuit 94. The MM circuit 94 generates a pulse signal to set the FF circuit 95. Upon setting the FF circuit 95, a high (H) level output is presented at the Q terminal of the FF circuit 95 and sent to the data selector 92 to transmit the initial position signal $D_0$ in place of the position signal $D_1$ to the B terminal of the comparator 91 (see FIG. 12F). Thus, the on-off control signal $V_N$ changes again low, causing the drive circuit 24 active and the oscillator 101 to generate pulses.

Upon the activation of the drive circuit 24, a low level direction signal $V_s$ is provided to rotate the ultrasonic motor (USM) 2 in the reverse direction, whereby the shutter 12 is controlled to close. The direction of rotation of the ultrasonic motor (USM) 2 is detected by means of the photosensors 86a and 86b and the encoder 87 provides a signal to cause the counter 90 to effect subtractive counting. With the reverse rotation, the counter 90 decreases the count value N. The counter 100, the latch circuit 98 and the correction circuit 102 operate in the same way as in the normal rotation of the ultrasonic motor (USM) 2, trying to adjust the actual speed of rotation of the ultrasonic motor (USM) 2 to a speed indicated by the speed signal W.

At the moment the count value N reaches a value represented by the initial position signal $D_0$, the comparator 91 outputs again a high (H) level on-off control signal $V_N$, whereby the driver circuit 24 is deactivated, so that the ultrasonic motor (USM) 2 stops at the initial position to close the shutter 12, completing an exposure. It is to be noted that the speed signal, if desirable, may be different between opening and closing the shutter 12.

In the above described embodiments, the deflection sensor, namely the potentiometer 15, 17 or the chopper cooperated with the ultrasonic motor (USM) 2, can be either cooperated with the shutter or disposed between the ultrasonic motor (USM) 2 and the shutter 12 so as to provide signals of position and speed of the shutter 12. In this case, the ROM correspondingly stores position signals D and speed signals W representing positions and speeds of the shutter 12 to be controlled. Furthermore, in place of controlling a speed signal $V_D$ applied to the drive circuit 24 in order to control the speed of rotation of the ultrasonic motor (USM) 2, it is possible to control the frequency of pulses of the oscillator 66 or the width of pulse applied to the ultrasonic motor (USM) 2.

The ultrasonic motor used in cooperation with the program shutter drive system of the invention is not limited to that referred in the above embodiments. Another type of ultrasonic motors are available. Such an ultrasonic motor is disclosed in, for example, in Japanese Unexamined Patent Application No. 60 -200,776, comprising a pair of piezoelectric plates disposed at 45 degrees with relative to a rotor of the ultrasonic motor, respectively. To cause an elliptic action of the piezoelectric plates so as to rotate the rotor, a compressive force and an alternative voltage is applied to the piezoelectric plates.

Although the present has been fully described by way of the preferred embodiments thereof with reference to the accompanying drawings, it is to be noted that various changes and modifications are apparent to those skilled in the art. Therefore, unless otherwise such changes and modifications depart from the scope of the present invention, they should be construed a included therein.

What is claimed is:

1. A program shutter system for controlling an opening size of a shutter according to a programmed schedule according to a brightness of a subject to be photographed, said system comprising:
   means for determining an exposure based on brightness of the subject and producing an exposure control output signal corresponding to the determined exposure;
   an ultrasonic motor for driving said shutter between open and close position; said ultrasonic motor being operative to rotate in a first direction to drive said shutter toward the open position and to rotate in a second direction opposite to the first direction of rotation thereof to drive said shutter toward the close position;
   control signal generating means for continuously providing a position indicating signal according to a predetermined program of operating representing the instantaneous opening size of said shutter, said position indicating signal defining a programmed schedule of operation of said shutter corresponding to said proper exposure output;
   position detecting means for continuously providing an actual position signal representing an actual opening size of said shutter;
   means for continuously comparing said position indicating signal with said actual position signal as said ultrasonic motor rotates in the first direction to drive said shutter toward the open position and as said ultrasonic motor rotates in the second direction to drive said shutter toward the close position to produce a differential drive signal proportional to a difference between said position indicating signal and said actual position signal; and controlling means responsive to said comparing means for controlling rotation of said ultrasonic motor, said controlling means including means for driving said ultrasonic motor at a differential speed that varies with said differential drive signal.

2. A program shutter drive system as defined in claim 1, wherein said position detecting means comprises a potentiometer incorporated between a rotor of said ultrasonic motor and a stationary member.

3. A program shutter drive system as defined in claim 2, wherein said position detecting means comprises a photoelectric chopper rotationally cooperating with said ultrasonic motor.

4. A program shutter drive system for controlling an opening size of a shutter according to a programmed schedule according to a brightness of a subject to be photographed, said system comprising:

means for determining an exposure based on brightness of the subject and producing an exposure control output signal corresponding to the determined exposure;

an ultrasonic motor for driving said shutter between open and close positions; said ultrasonic motor being operative to rotate in a first direction to drive said shutter toward the open position and to rotate in a second direction opposite to the first direction of rotation thereof to drive said shutter toward the close position;

control signal generating means for providing a speed indicating signal according to a predetermined program of operation representing the instantaneous opening and closing speeds of said shutter and for providing a position indicating signal representing its fully open opening size, said position and speed indicating signals defining a programmed schedule of operation of said shutter according to said proper exposure output;

position detecting means for continuously providing an actual position signal representing an actual opening size of said shutter;

speed detecting means for continuously providing an actual speed signal representing the actual speed at which said shutter opens and closes;

means for comparing said position and speed indicating signal with said actual position and speed signal as said ultrasonic motor rotates in the first direction to drive said shutter toward the open position and as said ultrasonic motor rotates in the second direction to drive said shutter toward the close position; and means responsive to said comparing means for controlling rotation of said ultrasonic motor.

5. A program shutter drive system as defined in claim 4, wherein said position detecting means comprises a potentiometer incorporated between a rotor of said ultrasonic motor and a stationary member.

6. A program shutter drive system as defined in claim 4, wherein said position detecting means comprises a photoelectric chopper rotationally cooperating with said ultrasonic motor.

* * * * *